July 30, 1940.   R. S. RAINEY ET AL   2,209,578
SPLIT OIL SEAL AND GASKET
Filed Oct. 29, 1938    2 Sheets-Sheet 1
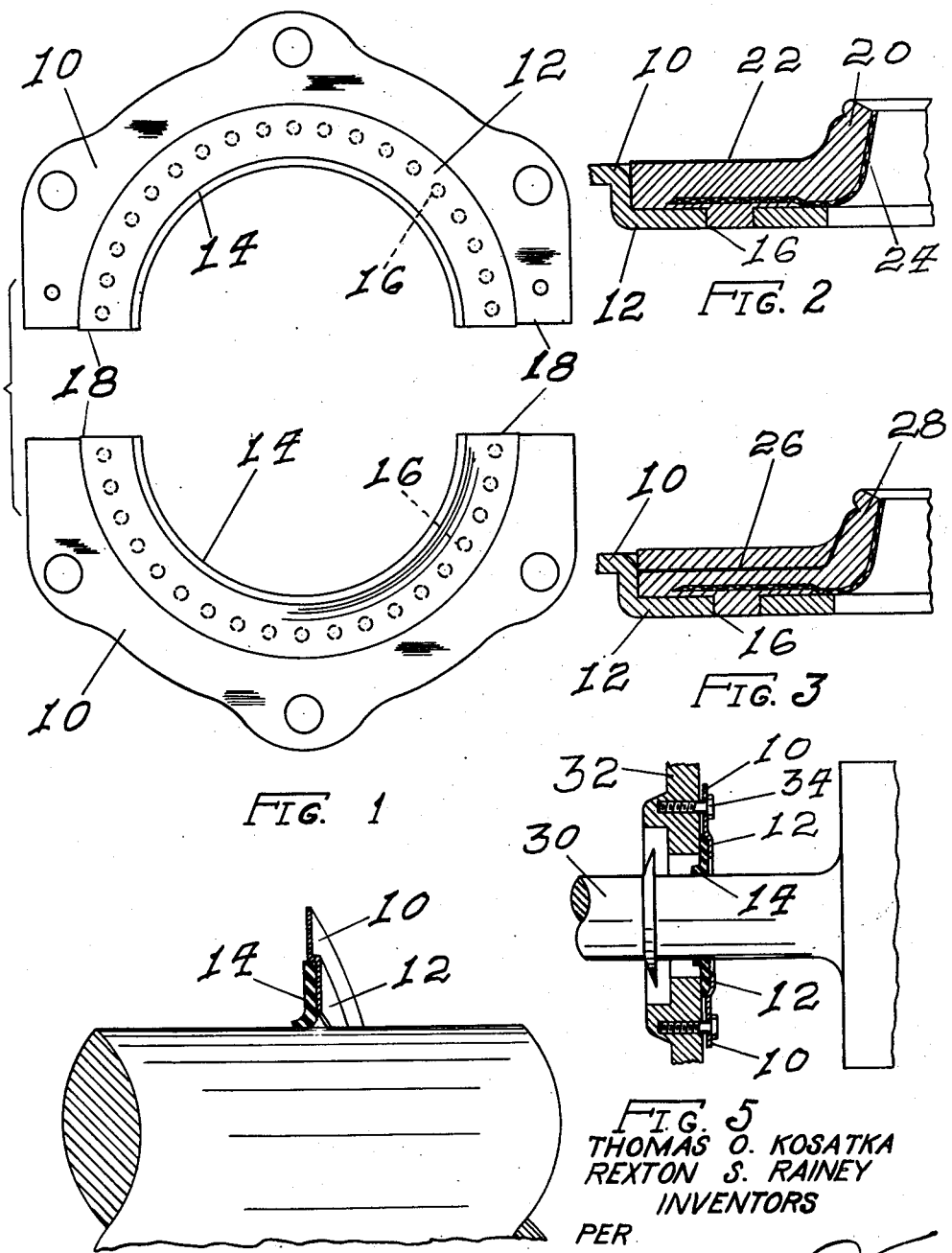
THOMAS O. KOSATKA
REXTON S. RAINEY
INVENTORS
PER
ATTORNEY

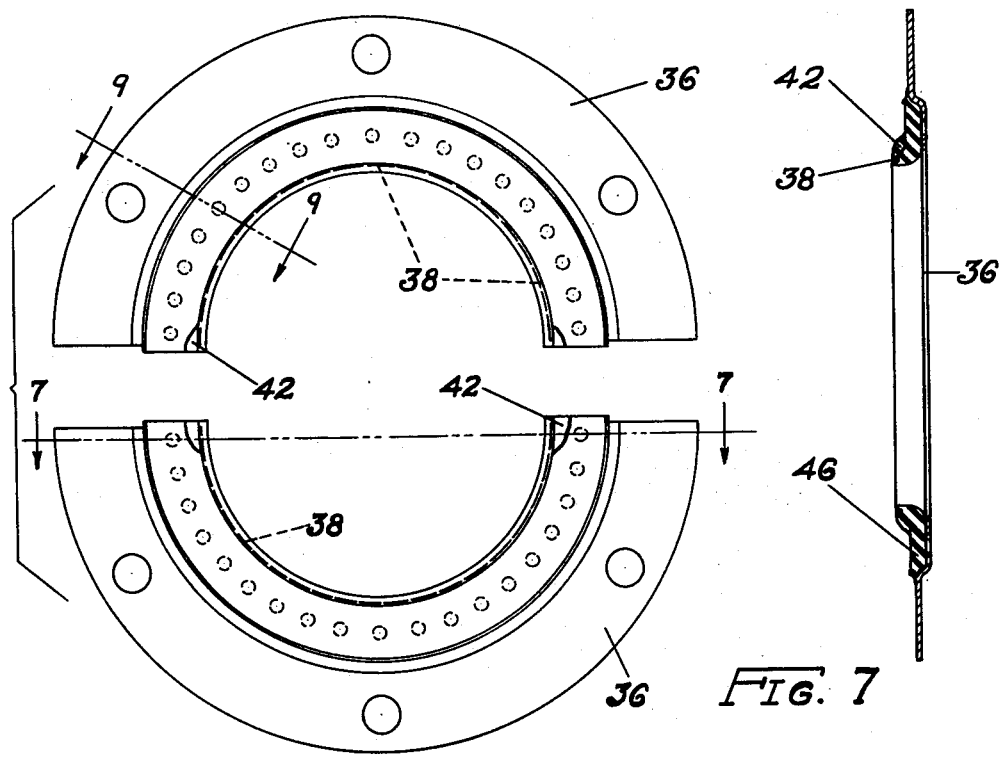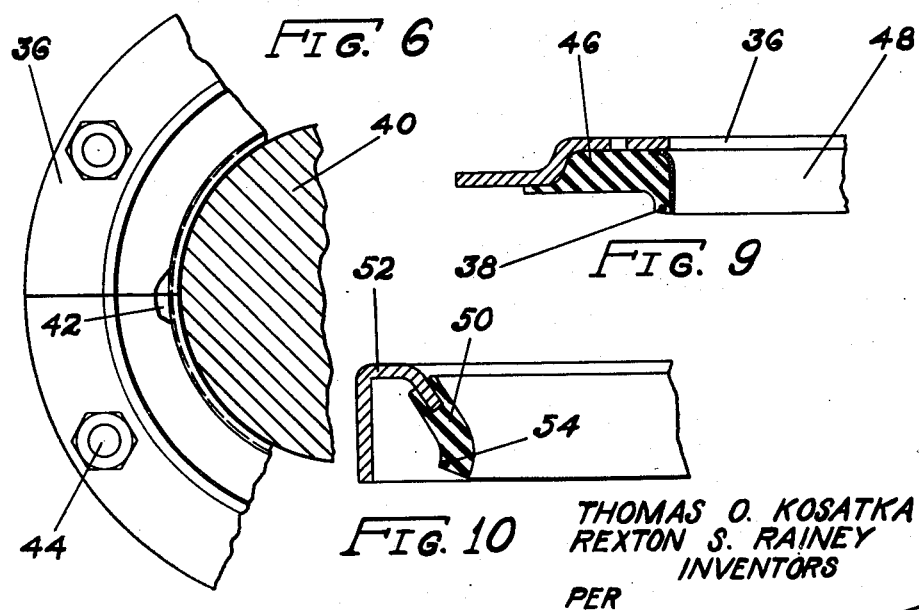

Patented July 30, 1940

2,209,578

UNITED STATES PATENT OFFICE 2,209,578

SPLIT OIL SEAL AND GASKET

Rexton S. Rainey, Wheaton, and Thomas O. Kosatka, Cicero, Ill., assignors to Victor Manufacturing & Gasket Company, Chicago, Ill., a corporation of Illinois Application October 29, 1938, Serial No. 237,758

2 Claims. (Cl. 288—3)

This invention relates to an improved split oil seal and gasket, and has, for one of its principal objects, the provision of a device for sealing oil against leakage around rotating shafts or the like, and which, at the same time, will act as a packing or gasket in order to prevent leakage of oil or similar fluids past other points such as the area of contact between the sealing element and the housing which surrounds the rotating shaft.

One of the important objects of this invention is the provision of a grease retainer or oil seal which is particularly adapted for use in internal combustion engines and particularly around the crank-shafts thereof or similar shafts which extend through portions of the housing, and the device can effectively be used in all cases where a two-part seal is desirable or necessary as distinguished from those seals which are made in one piece and annular.

A further important object of the invention is the provision in an oil seal or the like of an improved means for maintaining a desired resiliency and consequent sealing contact with the shaft, this residing particularly in the incorporation of a leaf or other spring element into the material which forms the flexible diaphragm or sealing portion of the structure.

Another and still further important object of the invention is the provision in an oil seal of the class described of a reinforcing or additional sealing face which is adapted to contact the shaft and which acts to prevent undue wear while, at the same time, affording a more effective sealing structure.

Still another object of the invention is to provide a new composition and combination of materials from which is produced the resilient sealing element or packing of the improved oil seals of the invention.

Other and further important objects of the invention will be apparent from the disclosures in the accompanying drawings and following specification.

The invention, in a preferred form, is shown in the drawings and hereinafter more fully described.

In the drawings:

Figure 1 is a plan view of the improved split oil seal and gasket of this invention, showing the same in two parts and ready for assembly about a shaft.

Figure 2 is an enlarged sectional view of the seal, showing particularly the flexible sealing element itself and also illustrating one type of spring reinforcement applied thereto.

Figure 3 is a sectional view somewhat similar to Figure 2, illustrating a slightly modified form of the sealing structure.

Figure 4 is a detail view, partly in section, illustrating the device as applied to a shaft and showing another modified form of the diaphragm.

Figure 5 is a still further detail view, mainly in section and illustrates a sealing element in position about a shaft and forming a seal against both the shaft and the housing through which the shaft extends.

Figure 6 is a plan view, showing the two portions of a modified form of seal constructed in accordance with the principles of this invention.

Figure 7 is a sectional view of the structure of Figure 6 taken on the line 7—7 of Figure 6 looking in the direction indicated by the arrows.

Figure 8 is a partial view of the structure of Figure 6, showing the same assembled and in position about a shaft.

Figure 9 is an enlarged detail sectional view taken on the line 9—9 of Figure 6.

Figure 10 is an enlarged sectional view showing another type of seal having some of the ideas of this invention embodied therein.

As shown in the drawings:

The reference numerals 10 indicate generally the metallic members of the improved combined split oil seal and gasket of this invention, these metallic elements being in complementary halves and slightly offset as best illustrated at 12 in Figures 4 and 5 so as to provide an inner annular recess for the reception of the flexible sealing element or diaphragm 14 which forms the remainder of the structure of this invention.

The sealing element itself is preferably composed of synthetic rubber or some similar material which readily lends itself to vulcanization in a mold and an according production in quantity and to accurate specifications. As best shown in Figure 1, by the dotted lines, a series of holes 16 are provided about the periphery of the offset portion 12 of the frame members 10, and some of the material of the diaphragm is forced into these openings 16 during the vulcanizing or molding process, thereby providing a firm bond between the rubber and the metal, and assuring against undesirable pulling away or relative rotation.

The synthetic rubber is combined with other agents such as oxides of mercury and zinc, rosin, and sulphur so as to produce a suitable vulcanizable material.

The sealing element 14 projects slightly beyond the contacting edges of the metallic frame members 10 all as best shown at 18 in Figure 1, and this provides for a compression of these portions about the shaft when the device is installed, thereby assuring of a positive and complete seal and also allowing for somewhat of a trimming off of these excess portions to provide an even still better fit if such is found desirable or necessary.

As illustrated in Figure 2, the diaphragm or sealing element 20 is provided on its outer face with a thin metal spring-like facing which is shaped as shown and which, accordingly, tends to force the sealing element more directly against the shaft when installed thereon, thereby providing a more positive and longer lasting seal.

The inner face of the diaphragm or sealing element is preferably reinforced with treated fabric such as illustrated at 24, and while this fabric is applied to that portion of the sealing element which actually contacts the shaft, it is carried away from the face and interiorly of the sealing structure as best shown in the sectional view so as to provide, first, a better body structure and composite device, and second, to allow for the extrusion of a desired portion of the synthetic rubber through the openings 16.

The fabric is preliminarily sized with a combination of tetrachloroethane and cellulose triacetate and is then coated with a combination of tetrachloroethane, cellulose and triacetate, and a rezyl resin.

In the modification illustrated in Figure 3, the finger spring or other resilient element 26 is actually embedded into the material of the sealing element 28, this being readily accomplished during the process of molding or vulcanization, and in some instances, this is more desirable than the structure of Figure 2 as it provides a slightly better reinforcing structure and with less liability of accidental removal of the spring and with less liability of accidental removal of the spring structure.

As best shown in Figure 5, the two complementary portions 10—12—14 of the seal are placed in position about a shaft 30 and are bolted onto a housing 32 through which the shaft extends by means of bolts 34. It will be noted that the thickness of the diaphragm or sealing element 14 is slightly greater than the depth of the annular groove outlined by the offset portion 12 and that this excess thickness is accordingly compressed against the face of the housing 32 when the plates 10—12 are pulled up against the housing by means of the bolts 34. This accordingly provides an additional seal against leakage of oil or the like between the housing and the metallic frame members 10, it being accordingly evident that the sealing structure itself thereby acts in the double capacity of both an oil seal about a rotating shaft and a gasket between two stationary parts.

In Figure 6, the two parts 36 of the sealing element are shown as having embedded in the synthetic rubber portion thereof, a steel wire 38 such as, for example, a piece of piano wire preliminarily coiled to desired shape and size, and then cut into semi-circular portions which are placed in the mold along with the synthetic rubber and the metal plates whereupon the entire assemblage is vulcanized together. The final product is shown in section in Figure 7, and it has been found that the semi-circular piece of spring-like wire aids greatly in accomplishing a definite seal about a shaft 40 such as illustrated in Figure 8.

In these figures, there is also shown a slight enlargement 42 of the sealing flange of the synthetic rubber packing structure, this enlargement being adjacent the points of contact of the two halves when the same are assembled together on an automobile crank-case or the like by means of bolts as illustrated at 44. These enlarged portions of the sealing element act together with the spring 38 to produce a more positive leak-proof joint along the lines of contact of the two opposed portions of the seal, it being further noted that while the synthetic rubber packing extends slightly beyond the ends of the metal flanges 36 and is, accordingly, somewhat compressed when the two parts are assembled as shown in Figure 8, the spring portions 38 do not so extend but are foreshortened in the rubber, thereby preventing buckling or distortion of the spring when the device is assembled.

The impregnated and coated fabric 48 which comprises a facing for the synthetic rubber packing element 46 is best shown in Figure 9, and it has been found that the use of this fabric together with the spring steel wire element 38 both incorporated into a synthetic rubber sealing diaphragm or packing member produces a very efficient and satisfactory seal which will last practically indefinitely.

In Figure 10 is shown a slightly different type of seal wherein a synthetic rubber packing element 50 is molded during the process of vulcanization to a metal flange or holder 52 somewhat cup-shaped as shown and which can, accordingly, be driven by means of a press fit or the like into a housing which surrounds a rotatable shaft. In this figure, the spring steel wire 54 is also shown as embedded in the synthetic rubber packing element just above the area of sealing contact with the shaft so as to additionally provide against undesirable leakage. The sized, impregnated and coated fabric shown in Figure 9 may or may not be employed depending largely upon the use to which the particular type of seal is to be put.

It will be evident that herein is provided a combination split oil seal and gasket which can be readily manufactured in quantity production at a relatively small cost and which, furthermore, can be definitely reinforced as and when desired and when produced, can be easily applied without any special tools and by any ordinary mechanic. Furthermore, the construction is such that the same can be readily removed in the event of repairs, and the seal itself can also be as readily replaced inasmuch as under ordinary circumstances, it will outlast the motor or other mechanism to which it is applied.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A split oil seal, comprising a pair of semi-circular metal plates, a correspondingly semi-circular flexible sealing element composed of synthetic rubber and vulcanized to each plate, the sealing element extending slightly beyond the ends of the plates and adapted to be compressed against an opposed portion of a similar sealing element when the two parts are assembled, together with an enlargement on the lip of each sealing element adjacent the aforesaid extension.

2. A split oil seal, comprising a pair of semi-circular metal plates, a correspondingly semi-circular flexible sealing element composed of synthetic rubber and vulcanized to each plate, the sealing element extending slightly beyond the ends of the plates and adapted to be compressed against an opposed portion of a similar sealing element when the two parts are assembled, together with a semi-circular flexible steel wire embedded in each sealing element adjacent the sealing edge thereof with the ends of the wire stopping slightly short of the ends of the sealing element.

REXTON S. RAINEY.
THOMAS O. KOSATKA.